Patented Dec. 5, 1939

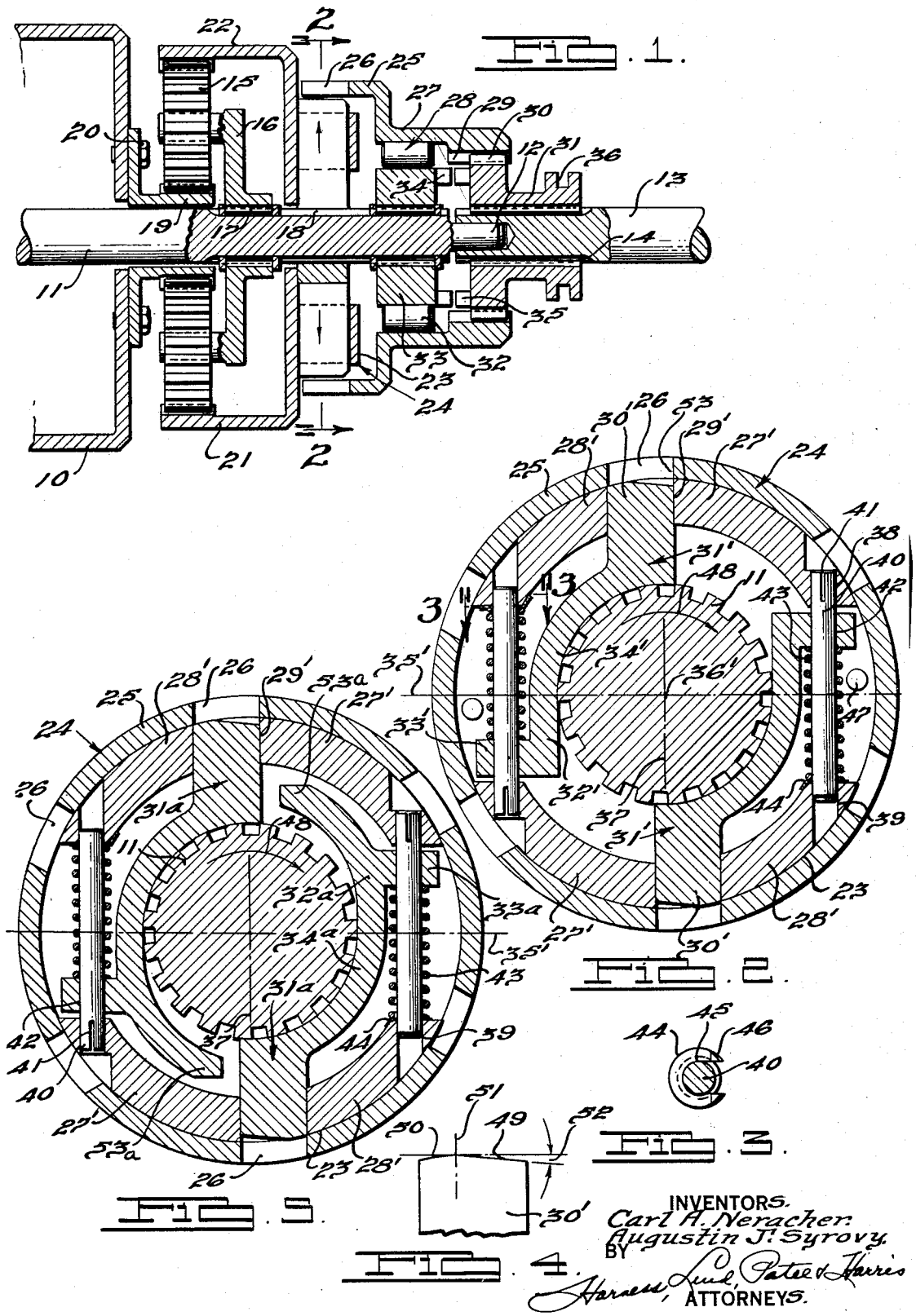

2,182,385

UNITED STATES PATENT OFFICE 2,182,385

CLUTCH

Carl A. Neracher and Augustin J. Syrovy, Detroit, Mich., assignors to Chrysler Corporation, Highland Park, Mich., a corporation of Delaware Application August 26, 1936, Serial No. 97,868

13 Claims. (Cl. 192—105)

This invention relates to clutches and refers more particularly to centrifugal clutches of the positive synchronous engaging type such as are used in controlling motor vehicle power driving 5 mechanism including transmissions, overdrives and the like.

One object of our invention is to provide improvements in the clutching characteristics of the aforesaid mechanisms whereby to provide 10 more positive operation of the clutch with less wear of the parts and noise during operation, especially when synchronizing the clutch parts preparatory for the clutch engagement.

Heretofore, with known types of positive syn15 chronous centrifugal clutches, the pawl or dog is arranged to "jump" the slots of a clutch shell until these parts are substantially synchronized at which time the pawl is moved by centrifugal force into clutching engagement with a slot. 20 This jumping action is facilitated by camming the outer face of the pawl so that it will pass across the slots during the synchronizing action without being permitted to prematurely enter a slot. However, such camming, which is ordi25 narily produced by progressively rounding the outer face of the pawl toward its leading edge and inwardly toward the axis of rotation, causes the pawl to "bounce" or rapidly vibrate inwardly and outwardly as it jumps each slot during syn30 chronizing. This bouncing produces an objectionable "ratcheting" noise and unduly wears the edges of the slots and the pawl face.

One feature of our invention resides in an improved pawl face which will avoid the aforesaid 35 objectionable characteristics by providing an improved form of cam face resulting in minimizing noise and wear to the degree where these items are no longer objectionable.

Additional objects of our invention are to pro40 vide an improved clutch of the type aforesaid, which is simpler in construction and cheaper to manufacture than more conventional clutches; also a clutch which has a minimum of friction and an improved distribution of weight whereby 45 the pawl may be made relatively light in weight with resulting improvements in its action by the spring and under centrifugal force.

With the foregoing and other objects in view, we have provided a clutch having an improved 50 construction and arrangement of parts more particularly illustrated in several embodiments thereof in the accompanying drawing, in which:

Fig. 1 is a sectional elevational view somewhat 55 diagrammatic in form, illustrating one application of our clutch to a motor vehicle power transmission mechanism.

Fig. 2 is a sectional elevational view through our clutch, the sections being taken as indicated by the lines 2—2 of Fig. 1.

Fig. 3 is a detail sectional view of the spring adjusting means, the section being taken by the lines 3—3 of Fig. 2, as indicated.

Fig. 4 is an enlarged detail view showing the cam face of the pawl.

Fig. 5 is a view similar to Fig. 2 but illustrating a modified clutch construction.

In order to illustrate one form of application of our clutch, we have shown in Fig. 1 a motor vehicle overdriving mechanism, it being understood that our clutch is adapted for use with a wide variety of mechanisms wherever it is desired to clutchingly connect parts of a mechanism which are adapted to have their rotational speeds synchronized. This overdriving mechanism comprises a conventional change speed transmission 10 from which the drive is taken by a drive shaft 11 piloted at its rear end 12 in the forward end of a driven shaft 13 having the splines 14.

The overdrive gearing is illustrated as the planetary type having the planetary pinions 15 supported by a carrier 16 drivingly connected at 17 with the splines 18 of the drive shaft 11. These planetary pinions engage a sun gear 19 non-rotatably secured at 20 to the housing of transmission 10, the planetary pinions also engaging an internal gear 21 having a rearward extension 22 for carrying the pawl core or cage 23 of the automatic clutch 24.

The other clutching structure of the automatic clutch 24 comprises a rotatable shell 25 formed with a plurality of circumferentially spaced pawl receiving slots 26, this shell 25 having a rearward extension 27 forming the outer cylindrical member of an overrunning clutch 28, this extension also being formed with the internal splines 29 engaged by corresponding splines 30 of an axially shiftable manually controlled clutching device 31 having a driving connection with the splines 14 of driven shaft 13.

The overrunning clutch 28 is provided with the usual clutching rollers 32 acted upon in the well known manner by the inner overrunning clutch cam member 33 drivingly connected to splines 18. Cam 33 is formed with an annular series of clutching teeth 34 adapted for engagement with the companion teeth 35 carried by the shiftable clutch member 31, the latter having a shifting groove 36 adapted in the well known manner to be manually shifted forwardly in response to a reverse drive setting of transmission 10 and for independent manual lockout control if desired as will be readily understood by those skilled in the art.

Before describing the structural details of our improved clutch 24, we will first briefly describe the general operation of the overdriving mechanism so that a typical application of our clutch will be readily understood. In an overdrive mechanism it is generally desirable to arrange the automatic clutch so that the overdrive will be established at or about a predetermined speed of motor vehicle travel, as for example forty miles per hour, and with such a setting of the automatic clutch a direct driving relationship between driving and driven shafts 11 and 13, respectively, is established prior to the engagement of the automatic clutch. This drive passes from drive shaft 11 through the overrunning clutch 28 and clutch device 31 to the driven shaft 13. Assuming the shift device to be in the position illustrated in Fig. 1, and further assuming that the motor vehicle is accelerated in the direct drive to a speed above the critical speed of operation of the automatic clutch 24, it will be apparent that during such times the pawl cage 23 will be rotated through the planetary gearing at a speed faster than the rotational speed of the shell 25 which always rotates at the speed of driven shaft 13 for the particular arrangement of parts illustrated. When the motor vehicle driver momentarily releases the usual accelerator pedal, the driving shaft 11 will slow down and the driven shaft 13 will continue its rotational speed by reason of the overrunning action at the clutch 28. This synchronizing action of the clutching structures of the automatic clutch 24 will very quickly synchronize the rotational speeds of the clutching structures whereupon the pawls, which will shortly be referred to in detail, will be projected into the slots 26 to establish a two-way drive at an overdrive ratio determined by the planetary gearing between shafts 11 and 13, the overrunning clutch 28 being automatically rendered inoperative by reason of its overrunning action during the time that the automatic clutch remains engaged.

The overdrive thus established passes from the drive shaft 11 through the carrier 16, planetary pinions 15 and thence to the internal gear 21 and automatic clutch 24 to drive the extension 27, clutch 31 and driven shaft 13 at the overdriving speed.

When the motor vehicle is decelerated from the over-driving condition, the automatic clutch will automatically disengage at some predetermined speed, usually five to ten miles per hour less than the critical speed of engagement, and when such disengagement takes place, the overrunning clutch 28 is automatically restored to usefulness in providing a direct drive between shafts 11 and 13 as aforesaid. When the direction of drive to the motor vehicle is reversed by reversing the normal direction of rotation of drive shaft 11, and at such other times as it may be desired to provide a direct two-way drive between shafts 11 and 13, it will be apparent that the overrunning clutch 28 must be locked out. This is accomplished by a forward shifting of the clutch device 31 to engage the clutch teeth 35 thereof with the teeth 34 whereupon the automatic clutch 24 as well as the overrunning clutch 28 will be locked out of operation.

Referring now particularly to Figs. 2, 3 and 4 which illustrate one embodiment of our automatic clutch, the pawl carrying cage 23 is rotatably centered within the shell 25 by the diametrically opposite pairs of guide projections 27' and 28' spaced from each other substantially at diametrically opposite points to provide a pair of outwardly extending guide ways 29' each of which slidably receives the clutching end portion 30' of a pawl 31'. Each pawl 31' has a counterbalancing guiding end portion 32' formed with a spring receiving seat 33' projecting laterally between an adjacent pair of the projections 27' and 28', the pawl end portions 30' and 32' being connected by an intermediate portion 34' curving at least partially around the shaft 11 and preferably conforming to the outer diameter thereof so that the shaft 11 will provide a bearing stop or seat for each pawl in the fully retracted position thereof as illustrated in Fig. 2. It will be noted that the counter-balancing guide portion 32' and the seat 33' are preferably disposed to one side of a plane 35' through the axis of rotation 36' and perpendicular to a plane 37 lying in the direction of pawl movement, the pawl clutching portion 30' being disposed to the other side of the aforesaid plane 35'. This arrangement of parts permits the use of a spring having the desired length and operating characteristics in controlling the pawl for a positive outward projection thereof at the particular desired critical speed.

Each adjacent pair of guide projections 27' and 28' are formed with aligned openings 38, 39, respectively, for receiving a guide pin 40 having a slot 41 in one end thereof for spreading the pin when the latter is in assembled position whereby the pin is fixed with respect to the projections 27' and 28'. Each pin 40 also extends through an opening 42 in a seat 33' for slidably guiding a pawl in conjunction with one of the guideways 29'.

In order to control the movement of each pawl 31' under the action of centrifugal force and to yieldingly urge the pawl to its inward or declutched position, a coil spring 43 is arranged for action at one end thereof against a seat 33', the other end of the coil spring acting against a guide projection 28' through the intermediary of one or more adjusting shims 44 best illustrated in Fig. 3. The pair of coil springs 43 for the two pawls 31' illustrated in Fig. 2 are thus disposed along opposite sides substantially adjacent the shaft 11 and so located that they may have sufficient room to accommodate the desired length of coil spring. The shims 44 are provided with the outwardly opening slots 45 to accommodate their ready insertion or removal, the terminal tongues 46 being deflected along the inner face of a projection 28' to prevent accidental displacement of the shims. It will be apparent that by the addition of shims, the compressive force of the springs 43 may be increased; or decreased by the removal of one or more shims as desired in order to vary the clutching characteristics of the automatic clutch. The pawls 31' are projected outwardly into engagement with slots 26, this outward movement is limited by reason of a pin 47 carried by the cage 23 and lying in the part of each of the seats 33' and thereby serving as a stop for the outward movement of the pawls.

Assuming the normal direction of rotation of the parts for a forward motor vehicle drive to be clockwise as indicated by the arrow 48 in Fig. 2, each pawl clutching portion 30' may be said to have its outer face provided with a leading portion 49 and a trailing portion 50, these portions respectively extending forwardly and rearwardly from a point approximately as indicated by the line 51 in Fig. 4. The trailing portion 50 which is preferably substantially less in circumferential length than the portion 49, is formed as a part of a cylindrical surface having its axis at 36' thereby conforming with the inner surface of shell 25. The portion 49 is preferably a plane surface sloping circumferentially in the direction of rotation and inwardly at an angle 52 which we have found gives the desirable results in the attainments of the objects of the invention when approximately two and one half to five degrees. We have discovered that the sloping plane surface 49 operates during the synchronizing action to strike the leading edge 53 of the slots 26 a glancing blow to thereby minimize the inward and outward movement of the pawls during the time that they are jumping the slots preparatory to clutching engagement therewith when the shell 25 and cage 23 are synchronized. This results in a minimization of noise incident to the pawl jumping action and also minimizes wear on the pawls and slots incident to their normal operation. The cylindrical portion 50 insures a bearing engagement with shell 25 during travel of each pawl between the slots 26 during the synchronizing action when the pawls are being projected outwardly and trying to enter the slots.

Referring to the slightly modified construction automatic clutch illustrated in Fig. 5, it will be apparent that this clutch is substantially similar to that illustrated in Fig. 2 and may be substituted therefor in the Fig. 1 mechanism or in other suitable mechanisms as aforesaid. Fig. 5 differs from Fig. 2 in that the pins 47 have been omitted and in their place each of the pawls 31ᵃ has its counter-balancing guide portion 32ᵃ extended to provide a terminal end portion 53ᵃ so disposed in conformity with shaft 11 to engage this shaft when the pawls are fully projected and thereby limit the outward movement of the pawls. The intermediate or yoke portion 34ᵃ otherwise corresponds to the intermediate portion 34' of Fig. 2 although it will be noted that in Fig. 5 the seats 33ᵃ are now disposed intermediate the end portions of the pawls 31ᵃ. In both Fig. 2 and Fig. 5 it will be noted that the ends of the pawls opposite the clutching portions thereof are spaced circumferentially from the clutching portion of a companion pawl, thereby simplifying the structure of the pawl, minimizing the weight thereof, and maintaining these parts free from engagement which would produce frictional resistance to their relative movement.

In as much as the remaining portions of the clutch illustrated in Fig. 5 may be similar to the Fig. 2 illustration, we have applied similar reference numerals to our Fig. 5 illustration, further description of such parts and the operation thereof not being necessary.

We do not limit our invention, in the broader aspects thereof, to the particular combination and arrangement of parts shown and described for illustrative purposes, since various modifications and changes will be apparent within the teachings of our invention as defined by the appended claims.

We claim:

1. In a centrifugally operated clutch for drivingly connecting coaxial relatively rotatable driving and driven shafts, relatively rotatable pawl carrying and pawl engaging clutching structures, one being adapted for driving connection to said driving shaft and the other to said driven shaft, a pawl carried by said pawl carrying structure and having a clutching portion adapted to move in response to centrifugal force exerted thereon into positive clutching engagement with said pawl engaging structure in response to substantially synchronized rotation of said structures at or above a predetermined speed, said pawl engaging structure having a portion thereof adapted to clutchingly receive said pawl clutching portion to positively connect said structures, said pawl having a counterbalancing portion so disposed as to be acted on by centrifugal force in opposition to said centrifugal force acting on said pawl clutching portion, said counterbalancing portion having a laterally extending abutment formed with an aperture, a coil spring seated at one end thereof on said abutment, a second abutment for the other end of said coil spring carried by said pawl carrying structure, a pin fixed relatively to said second abutment and extending axially through said coil spring and through said aperture to slidably guide movement of said pawl, and shim means between said coil spring and one of said abutments for adjusting the force of said spring.

2. In a centrifugally operated clutch for drivingly connecting coaxial relatively rotatable driving and driven shafts, relatively rotatable pawl carrying and pawl engaging clutching structures, one being adapted for driving connection to said driving shaft and the other to said driven shaft, a pawl carried by said pawl carrying structure and having a clutching portion adapted to move in response to centrifugal force exerted thereon into positive clutching engagement with said pawl engaging structure in response to substantially synchronized rotation of said structures at or above a predetermined speed, said pawl engaging structure having a portion thereof adapted to clutchingly receive said pawl clutching portion to positively connect said structures, said pawl having a counterbalancing portion so disposed as to be acted on by centrifugal force in opposition to said centrifugal force acting on said pawl clutching portion, said counterbalancing portion having a laterally extending terminal abutment formed with an aperture, a coil spring seated at one end thereof on said abutment, a second abutment for the other end of said coil spring carried by said pawl carrying structure, a pin fixed relatively to said second abutment and extending axially through said coil spring and through said aperture to slidably guide movement of said pawl, and shim means between said coil spring and one of said abutments for adjusting the force of said spring.

3. In a centrifugally operated clutch for drivingly connecting coaxial relatively rotatable driving and driven shafts, relatively rotatable pawl carrying and pawl engaging clutching structures, one being adapted for driving connection to said driving shaft and the other to said driven shaft, a pawl carried by said pawl carrying structure and having a clutching portion adapted to move in response to centrifugal force exerted thereon into positive clutching engagement with said pawl engaging structure in response to substantially synchronized rotation of said structures at or above a predetermined speed, said pawl engaging structure having a portion thereof adapted to clutchingly receive said pawl clutching portion to positively connect said structures, said pawl having a counterbalancing portion so disposed as to be acted on by centrifugal force in opposition to said centrifugal force acting on said pawl clutching portion, said counter-balancing portion having a laterally extending abutment formed with an aperture, a coil spring seated at one end thereof on said abutment, a second abutment for the other end of said coil spring carried by said pawl carrying structure, a pin fixed relatively to said second abutment and extending axially through said coil spring and through said aperture to slidably guide movement of said pawl, said counterbalancing portion having a terminal part thereof engaging one of said shafts to limit clutching movement of said pawl.

4. In a centrifugally operated clutch for drivingly connecting coaxial relatively rotatable driving and driven shafts, relatively rotatable pawl carrying and pawl engaging clutching structures, one being adapted for driving connection to said driving shaft and the other to said driven shaft, a pawl carried by said pawl carrying structure and having a clutching portion adapted to move in response to centrifugal force exerted thereon into positive clutching engagement with said pawl engaging structure in response to substantially synchronized rotation of said structures at or above a predetermined speed, said pawl engaging structure having a portion thereof adapted to clutchingly receive said pawl clutching portion to positively connect said structures, said pawl having a counterbalancing portion so disposed as to be acted on by centrifugal force in opposition to said centrifugal force acting on said pawl clutching portion, said counterbalancing portion having a laterally extending abutment formed with an aperture, a coil spring seated at one end thereof on said abutment, a second abutment for the other end of said coil spring carried by said pawl carrying structure, a pin fixed relatively to said second abutment and extending axially through said coil spring and through said aperture to slidably guide movement of said pawl, and a second pin carried by said pawl carrying structure and disposed in the path of movement of the first said abutment for limiting clutching movement of said pawl.

5. In a centrifugally operated clutch for drivingly connecting coaxial relatively rotatable driving and driven shafts, relatively rotatable pawl carrying and pawl engaging clutching structures, one being adapted for driving connection to said driving shaft and the other to said driven shaft, a pawl carried by said pawl carrying structure and having a clutching portion adapted to move in response to centrifugal force exerted thereon into positive clutching engagement with said pawl engaging structure in response to substantially synchronized rotation of said structures at or above a predetermined speed, said pawl engaging structure having a portion thereof adapted to clutchingly receive said pawl clutching portion to positively connect said structures, said pawl having a counterbalancing portion so disposed as to be acted on by centrifugal force in opposition to said centrifugal force acting on said pawl clutching portion, and yielding means acting on said pawl to oppose clutching movement thereof, said pawl having an intermediate portion connecting said clutching and counterbalancing portions, said intermediate pawl portion extending adjacent to and at least partially around one of said shafts, said counterbalancing portion having a terminal portion free from engagement with said clutching structures, said terminal portion being disposed to engage the last said shaft to limit centrifugal movement of the pawl.

6. In a centrifugal clutch, a rotatable shell having a plurality of slots, means including a pair of centrifugal force operated pawls rotatable within said shell, said rotatable means having a pair of spring seats, each of said pawls having a portion thereof adapted for projection into one of said slots when said pawls and shell are rotated at substantially the same speed at or above a predetermined minimum speed, and a pair of coil springs each having one end thereof acting on one of said pawls in opposition to movement thereof by centrifugal force, the other end of each of said coil springs being seated on one of said spring seats, said springs being disposed adjacent opposite sides of the axis of rotation of said pawls, each of said pawls having a counterbalancing portion disposed to one side of a plane through the axis of said rotatable means perpendicular to the direction of movement of said slot projecting portion of the same pawl, said rotatable means having a pair of guides respectively slidably engaged by said pawl counterbalancing portions, each of said pawl counterbalancing portions terminating in circumferentially spaced relationship with respect to the slot projecting portion of the other pawl.

7. In a centrifugal clutch, a rotatable shell having a plurality of slots, means including a pair of centrifugal force operated pawls rotatable within said shell, said rotatable means having a pair of spring seats, each of said pawls having a portion thereof adapted for projection into one of said slots when said pawls and shell are rotated at substantially the same speed at or above a predetermined minimum speed, and a pair of coil springs each having one end thereof acting on one of said pawls in opposition to movement thereof by centrifugal force, the other end of each of said coil springs being seated on one of said spring seats, said springs being disposed adjacent opposite sides of the axis of rotation of said pawls, each of said pawls having a counterbalancing portion disposed to one side of a plane through the axis of said rotatable means perpendicular to the direction of movement of said slot projecting portion of the same pawl, said rotatable means having a pair of guides respectively slidably engaged by said pawl counterbalancing portions, each of said pawl counterbalancing portions terminating in circumferentially spaced relationship with respect to the slot projecting portion of the other pawl, each of said pawls having a laterally extending shoulder intermediate its ends for seating said end of one of said coil springs.

8. In a centrifugal clutch, a rotatable shell having a plurality of slots, means including a pair of centrifugal force operated pawls rotatable within said shell, said rotatable means having a pair of spring seats, each of said pawls having a portion thereof adapted for projection into one of said slots when said pawls and shell are rotated at substantially the same speed at or above a predetermined minimum speed, and a pair of coil springs each having one end thereof acting on one of said pawls in opposition to movement thereof by centrifugal force, the other end of each of said coil springs being seated on one of said spring seats, said springs being disposed adjacent opposite sides of the axis of rotation of said pawls, each of said pawls having a counterbalancing portion disposed to one side of a plane through the axis of said rotatable means perpendicular to the direction of movement of said slot projecting portion of the same pawl, said rotatable means having a pair of guides respectively slidably engaged by said pawl counterbalancing portions, each of said pawl counterbalancing portions terminating in a laterally extending shoulder spaced circumferentially with respect to the slot projecting portion of the other pawl, each of said shoulders seating said end of one of said coil springs.

9. In a clutch for drivingly connecting driving and driven members, a pawl carrying structure drivingly connected to one of said members, a pawl receiving structure drivingly connected to the other of said members, a plurality of pawls carried by said pawl carrying structure and adapted for clutching movement, said pawl receiving structure being adapted to receive said pawls to positively connect said structures in response to substantially synchronized rotation of said structures at or above a predetermined speed, and yielding means urging said pawls to their disengaged position, said pawls having yoke portions acted on by said yielding means, said yoke portions extending at least partially around said member to which said pawl carrying structure is connected, each of said yoke portions terminating in circumferentially spaced relationship with respect to the remainder of said plurality of pawls, said pawl carrying structure having a pair of guides respectively slidably engaged by said pawl yoke terminal portions.

10. In a clutch for drivingly connecting driving and driven members, a pawl carrying structure drivingly connected to one of said members, a pawl receiving structure drivingly connected to the other of said members, a plurality of pawls carried by said pawl carrying structure and adapted for clutching movement, said pawl receiving structure being adapted to receive said pawls to positively connect said structures in response to substantially synchronized rotation of said structures at or above a predetermined speed, and yielding means urging said pawls to their disengaged position, said pawls having yoke portions acted on by said yielding means, said yoke portions extending at least partially around said member to which said pawl carrying structure is connected, each of said yoke portions terminating in circumferentially spaced relationship with respect to the remainder of said plurality of pawls and being disposed for engagement with the last said member for limiting outward movement of said pawls.

11. In a clutch for drivingly connecting driving and driven members, a pawl carrying structure drivingly connected to one of said members, a pawl receiving structure drivingly connected to the other of said members, a plurality of pawls carried by said pawl carrying structure and adapted for clutching movement, said pawl receiving structure being adapted to receive said pawls to positively connect said structures in response to substantially synchronized rotation of said structures at or above a predetermined speed, and yielding means urging said pawls to their disengaged position, said pawls having yoke portions acted on by said yielding means, said yoke portions extending at least partially around said member to which said pawl carrying structure is connected, each of said yoke portions terminating in circumferentially spaced relationship with respect to the remainder of said plurality of pawls and being formed with a seat for said yielding means, said pawl carrying structure having a pair of guides respectively slidably engaged by said pawl yoke terminal portions.

12. In a centrifugally operated clutch for drivingly connecting coaxial relatively rotatable driving and driven shafts, relatively rotatable pawl carrying and pawl engaging clutching structures, one being adapted for driving connection to said driving shaft and the other to said driven shaft, a pawl carried by said pawl carrying structure and having a clutching portion adapted to move in response to centrifugal force exerted thereon into positive clutching engagement with said pawl engaging structure in response to substantially synchronized rotation of said structures at or above a predetermined speed, said pawl engaging structure having a portion thereof adapted to clutchingly receive said pawl clutching portion to positively connect said structures, said pawl having a counterbalancing portion so disposed as to be acted on by centrifugal force in opposition to said centrifugal force acting on said pawl clutching portion, said counterbalancing portion having an abutment formed with an aperture, a pair of projections carried by said pawl carrying structure and having aligned apertures, said abutment being disposed between said projections, a coil spring having its opposite ends respectively thrusting on said abutment and on one of said projections for retracting said pawl to its declutched position, and a pin extending axially through said coil spring and through said abutment aperture to slidably guide movement of said pawl, said pin having its opposite ends fitting in said aligned apertures respectively, said pin being fixed against movement in said aligned apertures.

13. In a centrifugally operated clutch for drivingly connecting coaxial relatively rotatable driving and driven shafts, relatively rotatable pawl carrying and pawl engaging clutching structures, one being adapted for driving connection to said driving shaft and the other to said driven shaft, a pawl carried by said pawl carrying structure and having a clutching portion adapted to move in response to centrifugal force exerted thereon into positive clutching engagement with said pawl engaging structure in response to substantially synchronized rotation of said structures at or above a predetermined speed, said pawl engaging structure having a portion thereof adapted to clutchingly receive said pawl clutching portion to positively connect said structures, said pawl having a counterbalancing portion so disposed as to be acted on by centrifugal force in opposition to said centrifugal force acting on said pawl clutching portion, said counterbalancing portion having an abutment formed with an aperture, a pair of projections carried by said pawl carrying structure and having aligned apertures, said abutment being disposed between said projections, a coil spring having its opposite ends respectively thrusting on said abutment and on one of said projections for retracting said pawl to its declutched position, and a pin extending axially through said coil spring and through said abutment aperture to slidably guide movement of said pawl, one of said pin ends being slotted to accommodate spreading of the pin end-portions adjacent the slot for anchoring said pin in one of said projections.

CARL A. NERACHER.
AUGUSTIN J. SYROVY.